United States Patent [19]
Neff

[11] Patent Number: 4,462,427
[45] Date of Patent: Jul. 31, 1984

[54] FOUR-WAY STACKING VALVE WITH COMMON ELECTRICAL CONDUIT AND BODY MOUNTED INDIVIDUAL EXHAUST FLOW CONTROLS THAT PROJECT THROUGH THE COVER

[75] Inventor: James A. Neff, Bloomfield Township, Oakland County, Mich.

[73] Assignee: MAC Valves, Inc., Wixom, Mich.

[21] Appl. No.: 352,768

[22] Filed: Feb. 26, 1982

[51] Int. Cl.³ .............................................. F15B 13/08
[52] U.S. Cl. ........................... 137/625.64; 137/596.16; 137/884
[58] Field of Search .............. 137/596, 596.16, 625.64, 137/625.65, 625.66, 625.69, 884, 885

[56] References Cited

U.S. PATENT DOCUMENTS

| | | | |
|---|---|---|---|
| 2,993,511 | 7/1961 | Johnson | 137/625.64 |
| 3,385,166 | 5/1968 | Kroffke | 137/625.6 |
| 3,550,621 | 12/1970 | Lansky et al. | 137/884 |
| 3,608,586 | 9/1971 | Daggy | 137/625.65 |
| 4,359,064 | 11/1982 | Kimble | 137/884 X |

Primary Examiner—Gerald A. Michalsky
Attorney, Agent, or Firm—Robert G. Mentag

[57] ABSTRACT

A four-way stacking air valve with a common exhaust passageway that extends through all of the valves in a stack of valves and a pair of end plates, and with each of the valves being provided with a pair of adjustable flow control valves mounted in the valve body and projected through the valve body cover, and having valve elements extended into separate exhaust passages connected to the common exhaust passageway. A common electrical wire passage extends through all of the valves and end plates in a stack of valves. Each of the valves has a wire tuck chamber in the valve body, on each side of the electrical wire passage. Each of the valves can be operated by one, or two solenoid operated pilot valves. The pilot air valves may employ either internal or external pilot air which is provided through common pilot air supply passageways in the valves and in the end plates. The pilot air is exhausted through a common pilot air exhaust passageway that extends through all of the valves in a stack of valves, to exhaust ports in the end plates of the stack of valves.

7 Claims, 5 Drawing Figures

4,462,427

FOUR-WAY STACKING VALVE WITH COMMON ELECTRICAL CONDUIT AND BODY MOUNTED INDIVIDUAL EXHAUST FLOW CONTROLS THAT PROJECT THROUGH THE COVER

TECHNICAL FIELD

This invention relates generally to the air valve art, and more particularly to an improved four-way valve having a common electrical conduit and individual body mounted exhaust flow controls that project through the cover. The four-way valve can be used in stacks with other valves having a common pressurized air inlet passageway and a common exhaust outlet passageway, and wherein each exhaust passage, between the common exhaust outlet passageway and each exhaust chamber in the main valve spool bore, has an individual flow control valve operatively mounted therein. The air valve of the present invention is adapted for use in an air flow line for controlling the flow of pressurized air to both ends of an air cylinder, or the like.

BACKGROUND ART

It is known in the air valve art to provide valves which can be employed in stacks. Heretofore stackable air valves have been provided which include flow control valves in exhaust ports. However, it has not been possible heretofore to provide a stacking body which will provide a four-way stacking valve with a stacking body provided with a separate flow control valve for each exhaust passage, between a common exhaust outlet passage and each exhaust chamber in the main valve spool bore, and with a common electrical conduit so as to permit a solenoid to be electrically connected to the air valve with one connection at each individual valve in a stack of valves. Flow control valves have been used before in exhaust ports in more complicated structures, as in U.S. Pat. Nos. 2,912,007 and 2,993,511.

DISCLOSURE OF THE INVENTION

In accordance with the present invention, a four-way stacking air valve is provided which has integral flow controls in the body of the valve, for controlling flow in individual exhaust passages in the body of the valve, and which flow control valves project through the cover. A stack of the valves may be operatively positioned between a pair of end plates which are each provided with a single exhaust outlet passageway and port, and which are connected to a common exhaust outlet passageway running through all of the valves in the stack of valves. The end plates are also each provided with a single inlet port and passageway that supplies air under pressure to all of the valves in the stack of valves through a common pressurized air inlet passageway that extends through all of the valves in the stack.

The two exhaust chambers in the main spool valve bores in each of the valves in the stack exhaust into a common exhaust outlet passageway that is connected to a similar common exhaust passageway in the adjacent valves in the stack and thence to exhaust ports in end plates. Each of the valves in the stack is provided with a pair of common pilot air supply passages which may be supplied with internal pilot air from the common pressurized air inlet passageway, or from an external supply of pilot air. All of the valves in the stack are also connected to a common pilot air exhaust passageway whereby the pilot air can be selectively dumped to the atmosphere through a suitable muffler, or piped away to an external location. A pair of flow control valves are body mounted and project through the valve cover and operatively extend into the exhaust passages of each valve in the stack, to control the exhaust air coming out of either end of an air cylinder, to control the speed at which the cylinder travels from one position to another. Each valve in the stack may be provided with a two-position valve spool assembly, or a self-centering, three-positioned valve spool assembly, with a pilot air operated piston means operatively engaged with at least one end of the valve spool in each valve.

BEST MODE OF CARRYING OUT THE INVENTION

Figure 1:
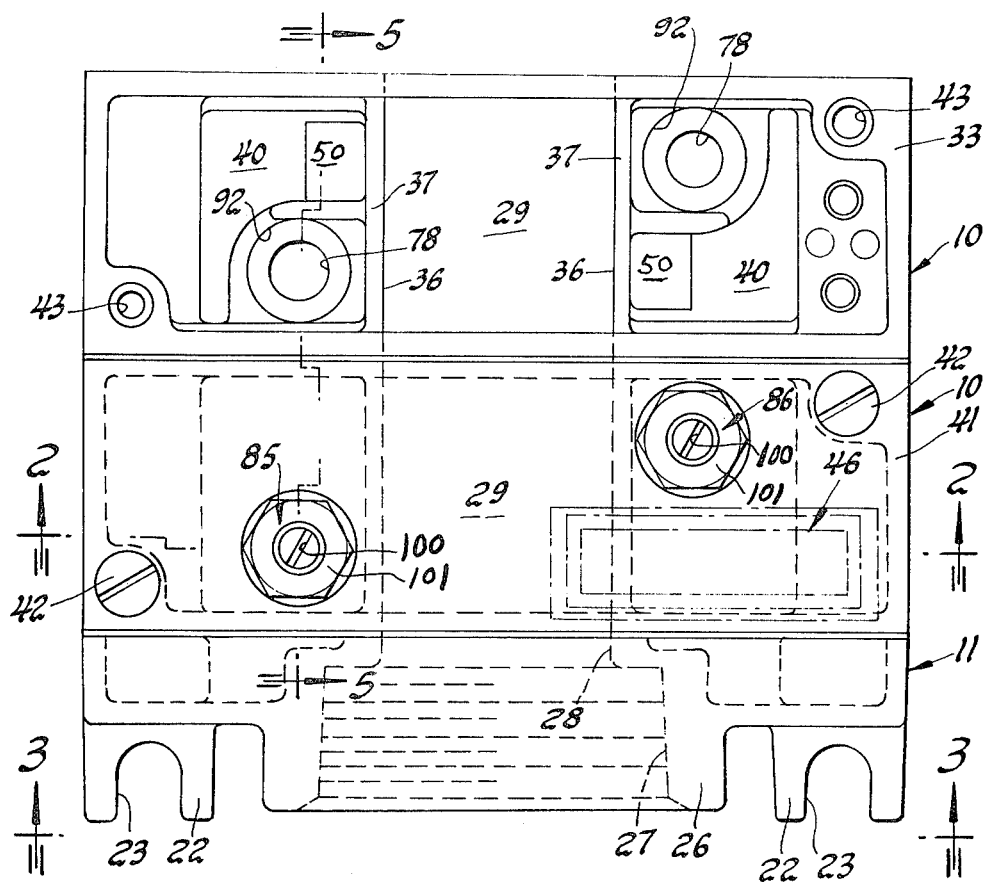
FIG. 1 is a top plan view, with parts removed, of a four-way stacking valve made in accordance with the principles of the present invention.
Figure 2:
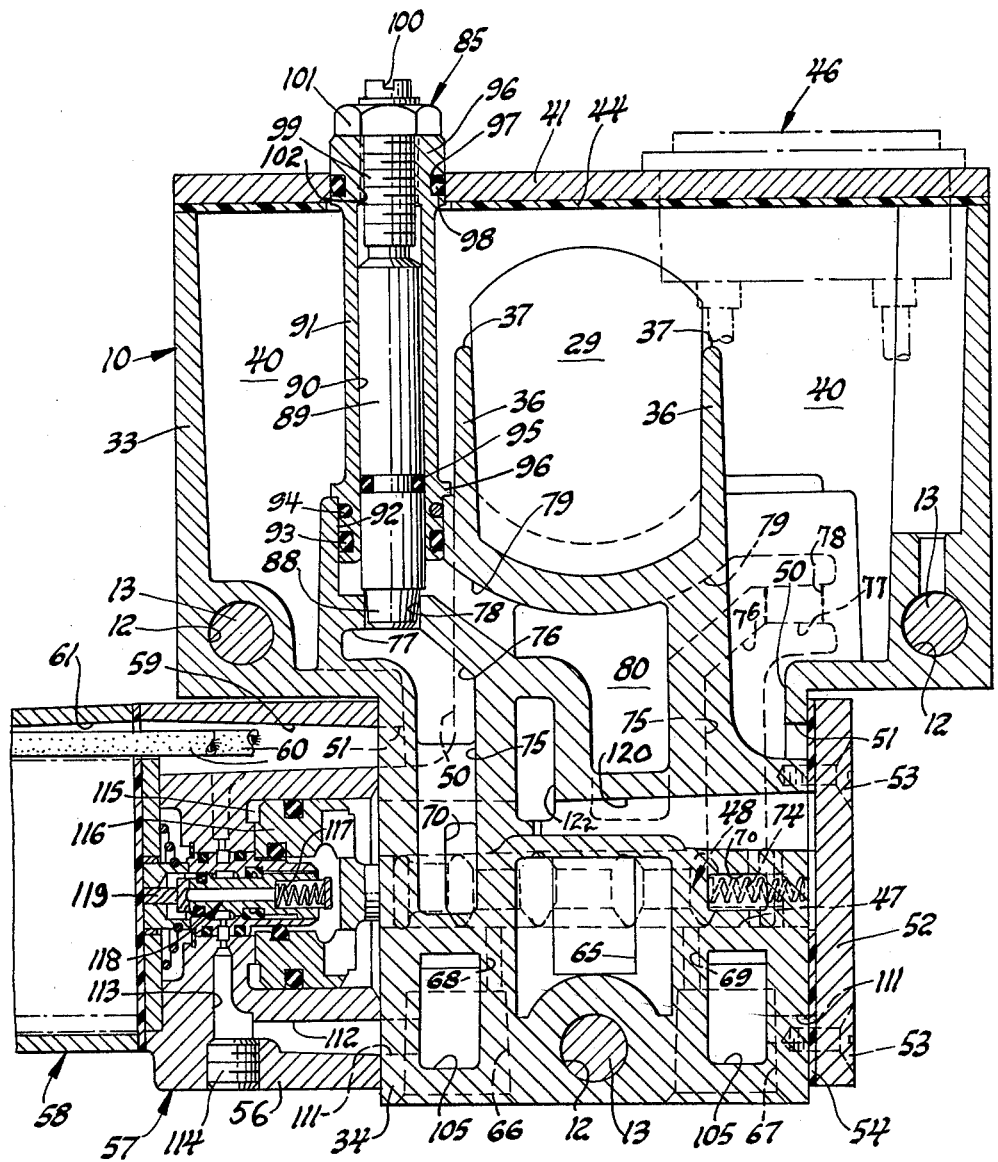
FIG. 2 is an elevation section view, with parts removed, of the valve structure illustrated in FIG. 1, taken along the line 2—2 thereof, and looking in the direction of the arrows.
Figure 3:
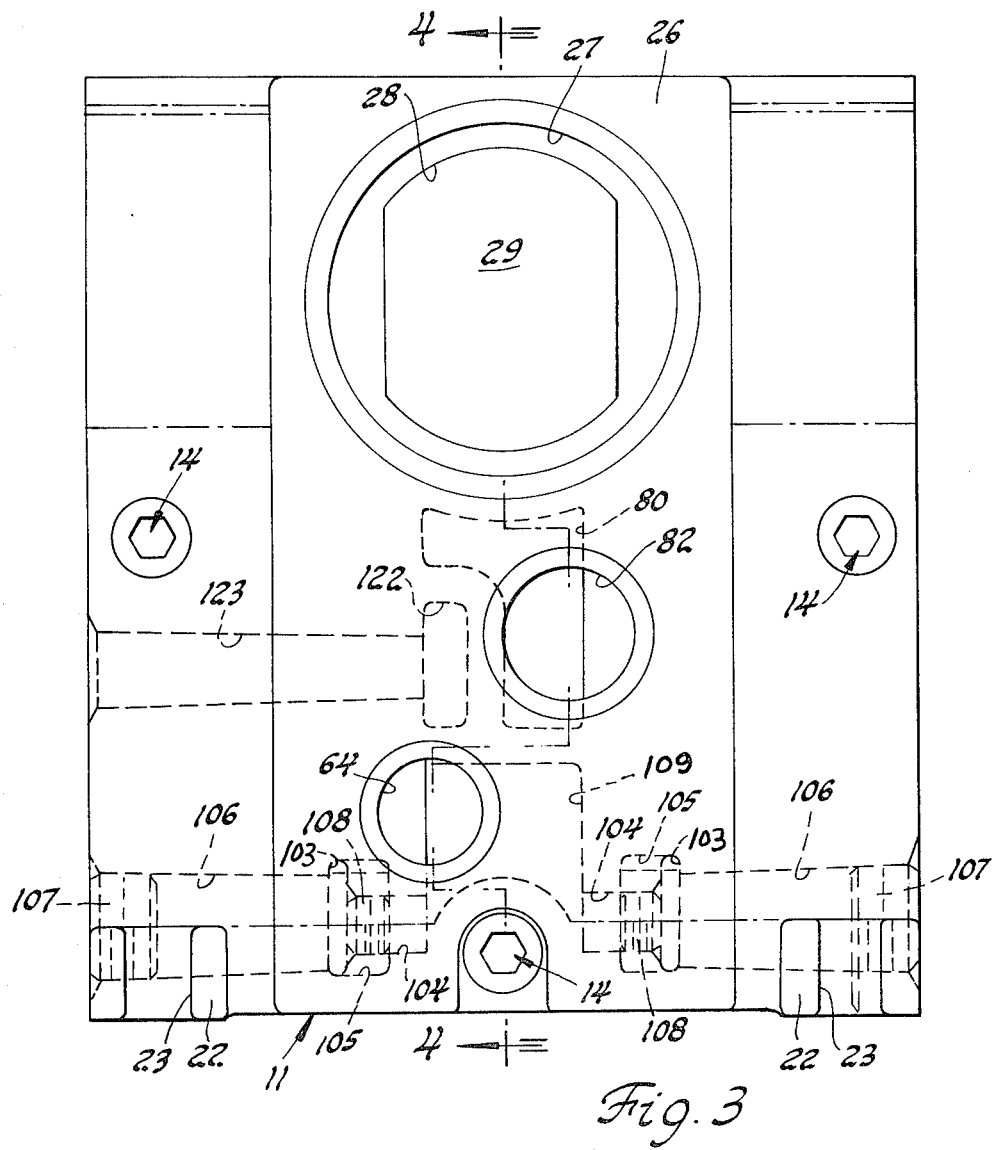
FIG. 3 is a front elevation view of the structure illustrated in FIG. 1, taken along the line 3—3 thereof, and looking in the direction of the arrows.
Figure 4:
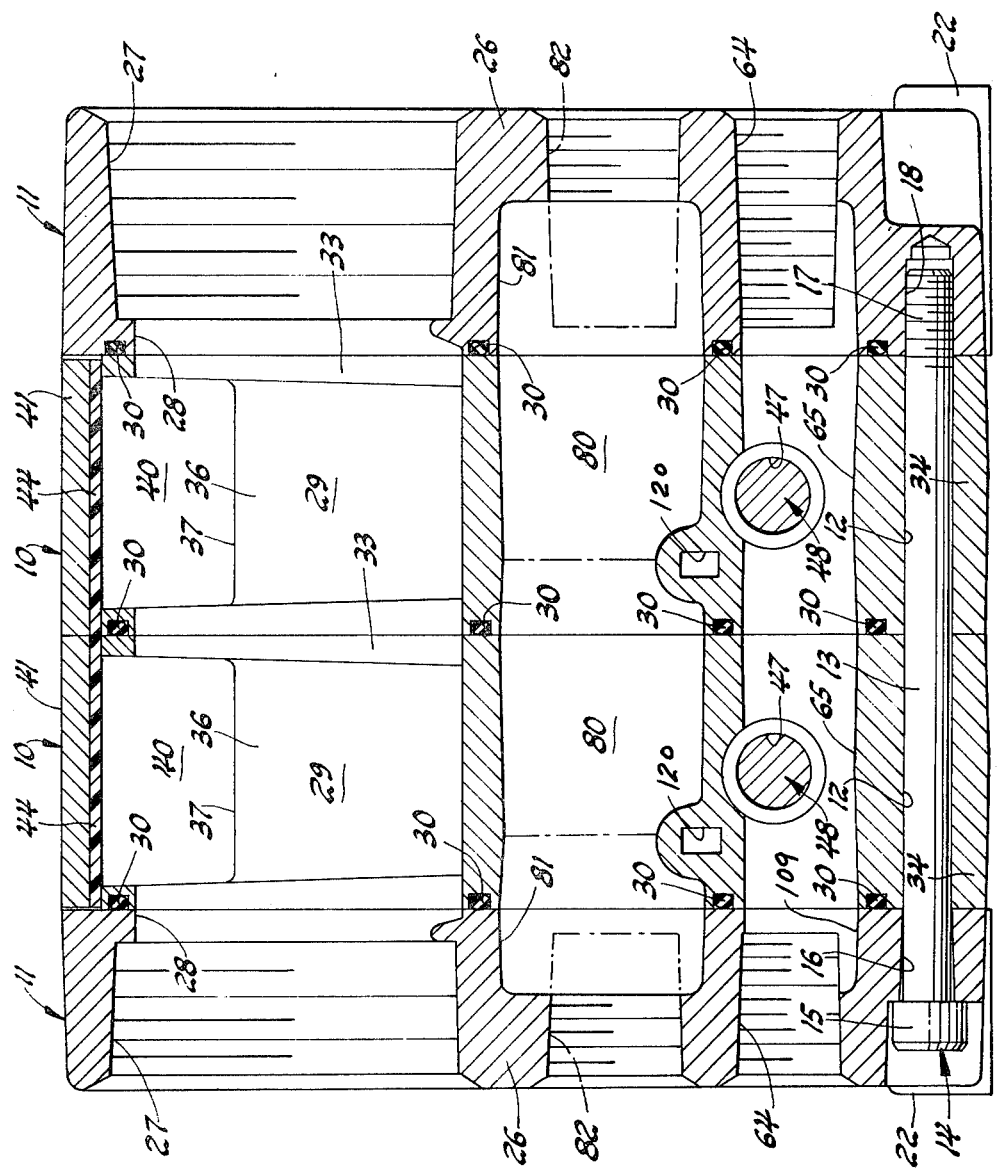
FIG. 4 is an elevation section view of the valve structure illustrated in FIG. 3, taken along the line 4—4 thereof, and looking in the direction of the arrows.

Referring now to the drawings, and in particular to FIGS. 1 through 3, each numeral 10 generally designates a separate four-way valve in a stack of valves. As viewed in FIG. 4, each end of the stack of valves is seated against an end plate, generally indicated by the numeral 11. As shown in FIGS. 2 and 4, the plurality of valves 10 in a stack is connected by a plurality of suitable tie rods, generally indicated by the numerals 14, that each have a body 13 which extends through a bore 16 in one end plate 11 and bores 12 in each of the valves 10. Each tie rod 14 has a conventional tie rod head 15 on one end, and the other end is provided with a reduced diameter threaded end 17 (FIG. 4), which is threadably mounted in a suitable threaded bore 18 in the other end plate 11. As shown in FIG. 4, suitable seal members 30 are operatively mounted between each of the valves 10 in the stack and the end plates 11.

As shown in FIGS. 1 and 3, each of the end plates 11 is provided with a pair of suitable mounting feet or projections 22 on the outer lower side thereof. Each of the mounting feet 22 has a U-shaped opening 23 therein for the reception of a suitable mounting screw, or the like, for securing the stack of valves 10 to a suitable support table, or other means, between the pair of end plates 11.

As shown in FIGS. 1 and 3, the end plates 11 include a body 26 which is provided on the upper end thereof with a longitudinal, threaded pipe bore 27 for the reception of a conventional electrical conduit, for carrying electrical wires connected to a suitable power source, for powering the solenoids for operating each of the valves 10. The inner end of the threaded pipe bore 27 communicates with a bore 28 in the rear side of the end plate body 26 to complete the electrical wire passage through the end plate 11. As shown in FIG. 4, the electrical wire passage 28 is connected to a common electrical wire passage 29, which is formed longitudinally through the upper end of the adjacent valve 10. The other valves 10 in the stack of valves would each be provided with a similar common electrical passage 29, and said passages 29 would all be aligned with the electrical wire passages 27 and 28 in the two end plates 11 supporting the stack of valves 10.

As shown in FIG. 2, each of the valves 10 is provided with a valve body that is substantially T-shaped in transverse cross section, and which has an upper portion 33 and a lower portion 34. As shown in FIG. 2, each of the electrical wire passages 29 in each of the valves 10 is bounded by a pair of laterally spaced apart internal integral walls 36 which have an opening formed through each of the upper ends thereof, so as to provide on the upper end of each of the walls 36 a top edge portion 37 that is disposed downwardly from the top of the valve body upper portion 33. It will be seen that the electrical wires coming into the stack of valves 10 through the end plate passages 27 and 28, and into the valve passages 29 can be disposed over each of the passage walls 36 and into the electrical wire tuck chambers 40 (FIGS. 1 and 2), which are formed outboard of each of the internal walls 36 in the valve body upper portion 33.

As shown in FIG. 2, the top ends of the wire tuck chambers 40, and the top end of the electrical wire common passage 29 in each of the valves 10 are enclosed by a valve body cover 41. A suitable gasket 44 is mounted between the inner face of the valve body cover 41 and the top end of the valve body upper portion 33. The valve body cover 41 is releasably secured to the valve body upper portion 33 by a plurality of suitable machine screws 42 (FIG. 1), which extend through the cover 41 into suitable threaded bores 43 in the valve body upper portion 33. The numeral 46 in FIGS. 1 and 2 generally designates an optional indicator light which may be operatively mounted through the valve top end cover 41, and extended into the electrical wire common passage 29 for operative connection to the electrical wires for the solenoid or solenoids operating each respective valve 10, so that when a solenoid is operated, the indicator light 46 would be energized to show that the solenoid is operating.

Figure 5:
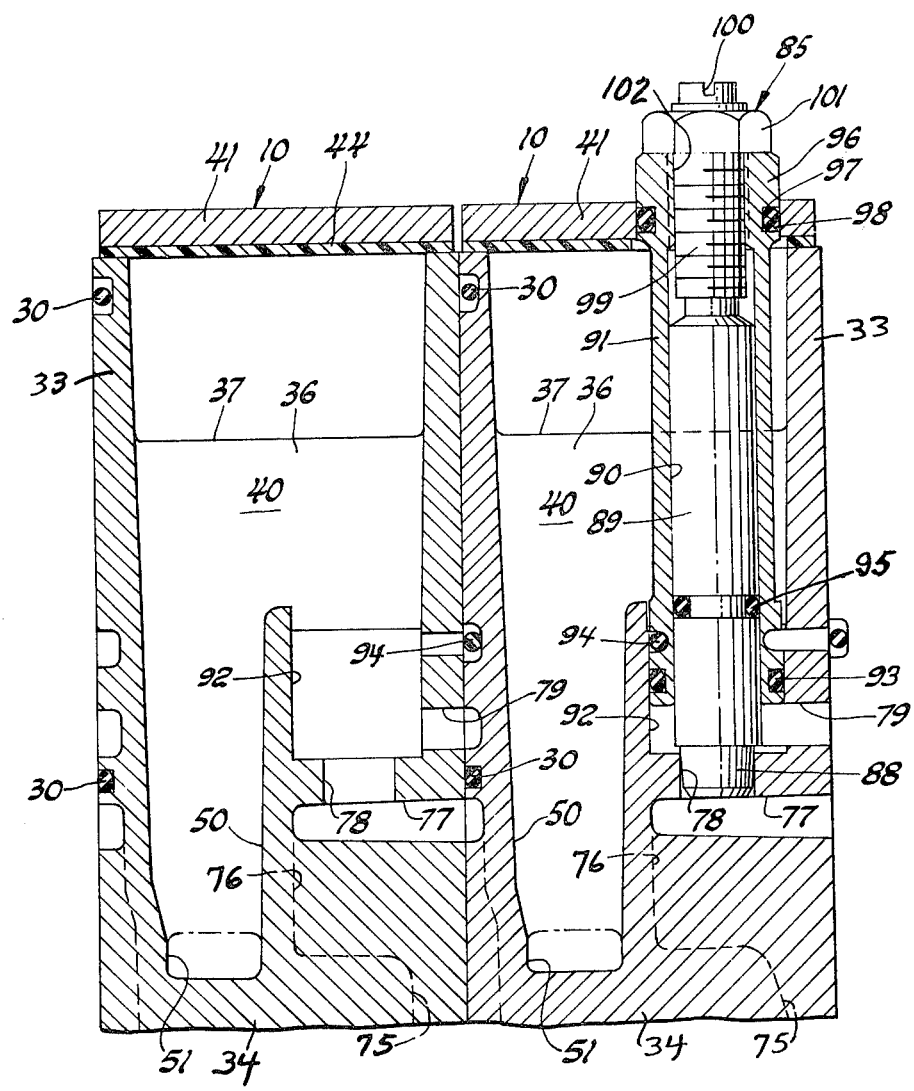
FIG. 5 is an elevation section view of the two valves illustrated in FIG. 1, taken along the line 5—5 thereof, and looking in the direction of the arrows.

The electrical wires for operating one or more solenoids 58 for each of the valves 10 are led down through the valve body portions 33 and 34, and to the respective solenoids 58 by the following described passages. As shown in FIGS. 2 and 5, the left side of each of the valves 10 is provided with a wire passage 50, in the lower end of the valve body upper portion 33, which communicates with the lower end of the left wire tuck chamber 40. The lower end of the wire passage 50 communicates with a passage or outlet opening 51 which extends to the exterior of the side of the valve body lower portion 34. As shown in FIGS. 2 and 5, the right side wire tuck chamber 40 is also connected by a suitable wire passage 50 to a wire outlet opening or passage 51, so as to conduct electrical wires to a second solenoid 58 on the right end of the valve 10, if a second solenoid is used.

As shown in FIGS. 2 and 4, the illustrated valves 10 are each provided with the usual main valve spool bore 47, in which is operatively mounted the usual main valve spool, generally indicated by the numeral 48. The illustrated valve spool 48 is spring operated in one direction, and pilot air operated in the opposite direction, with the flow of pilot air being controlled by a solenoid operated pilot valve, generally indicated by the numeral 57. As shown in FIG. 2, one end of the valve body lower portion 34, in which the return spring 74 of the main valve spool 48 is mounted, is enclosed by a suitable cover 52 and gasket 54. The cover 52 is secured in place on the valve body lower portion 34 by suitable machine screws 53.

As shown in FIG. 2, the numeral 56 designates a pilot valve adaptor housing, and the numeral 58 generally indicates a conventional solenoid which is operatively attached to the pilot valve adaptor housing 56 by suitable machine screws (not shown). The pilot valve adaptor housing 56 is releasably secured to the left side of the valve body lower portion 34 by suitable machine screws (not shown). As shown in FIG. 2, the solenoid wires 60 for energizing the illustrated solenoid 58 are conducted through wire passages 59 and 61, in the pilot valve adaptor housing 56 and the housing for the solenoid 58, respectively. The solenoid wires 60 are then conducted through the adjacent opening 51 (FIGS. 2 and 5) in the valve body lower portion 34, and thence upwardly through the adjacent wire passage 50 and into the left wire tuck chamber 40, as viewed in FIG. 2.

As shown in FIG. 4, each of the end plates 11 is provided with a longitudinal threaded inlet port 64 for connection to a suitable source of air under pressure. The inner end of the inlet port 64 is connected to one end of a longitudinal inlet air passageway 65 formed through the adjacent valve 10. The other valves 10 in the stack of valves are also provided with similar inlet air passageways 65 which extend completely therethrough.

As illustrated in FIG. 2, each of the valves 10 is provided with a pair of cylinder or work ports 66 and 67 which extend inwardly from the bottom end of the valve body lower end portion 34. The cylinder ports 66 and 67 are each connected to a cylinder chamber 68 and 69, respectively, in the main spool valve bore 40. As shown in FIG. 2, a pair of exhaust chambers 70 are formed in the valve body lower portion 34, at opposite ends of the main valve spool bore 47, and they communicate with the main valve spool bore 47. As shown in FIG. 2, the left exhaust chamber 70 is connected by the exhaust passages 75, 76 and 77 that extend upwardly into communication with a vertical exhaust bore passage 78 in the valve body upper portion 33.

As shown in FIGS. 2 and 5, the upper end of the exhaust bore passage 78 communicates with an enlarged diameter vertical bore 92, that is open to a wire chamber 40 in the valve body upper portion 33. As shown in FIG. 2, an exhaust flow control valve, generally indicated by the numeral 85, is operatively mounted through the cover 41 and the inner end portions are operatively mounted in the bores 78 and 92. The flow control valve 85 includes a valve element 88 which is operatively mounted in the vertical bore 78 that connects through an exhaust passage 79 with a common exhaust outlet passageway 80 that extends longitudinally through the valve body portions 33 and 34. The exhaust flow control valve element 88 is shown in the closed position, but it will be understood that it is adjustable upwardly, as viewed in FIG. 2, to permit a selective flow of exhaust air through the bore 78 into the common exhaust passageway 80, in a controlled manner, depending upon the location of the valve element 88 relative to the exit end of the bore 78, namely, the upper end of the bore 78, as viewed in FIG. 2. As shown in FIG. 4, the common exhaust passageway 80 in the valve 10 adjacent an end plate 11 communicates with passage 81 which in turn communicates with the inner end of a threaded common exhaust port 82.

As shown in FIGS. 2 and 5, the exhaust flow control valve 85 further includes a valve stem 89 which is integral with the flow control valve element 88. The valve stem 89 is provided with an O-ring seal 95 that is mounted in a groove formed around the outer periphery of the valve stem 89, and which is slidably mounted in a bore 90 formed axially in the inner end of a flow control valve cylindrical retainer 91. The lower or inner end of the flow control valve retainer 91 is mounted in the bore 92. An O-ring seal 93 and a releasable retainer ring 94 are mounted in grooves around the lower end of the periphery of the valve retainer 91, in the bore 92. The valve retainer 91 is provided with a shoulder 96. Retainer ring 94 locates the retainer 91 in the bore 92. The valve retainer 91 is provided with an axial threaded bore 102 in the outer or upper end, which communicates with the retainer bore 90. The integral outer threaded end 99 of the valve stem 89 is threadably mounted in the threaded bore 102. The upper or outer head end 96 of the valve retainer 91 is enlarged and it is extended outwardly through an opening 97 in the cover 41. A suitable O-ring 98 is seated in a groove around the enlarged head 96 and it sealingly engages the inner periphery of the cover opening 97. The valve element 88 is adjusted to a desired position in the bore 78 by means of a screw driver, or the like, being placed in the slot 100, in the outer end of the valve stem 89, and turning the valve stem 89 in a desired direction. The valve stem 89 may be locked in a desired adjusted position by a suitable lock nut 101.

As shown in FIG. 2, the exhaust chamber 70 at the right end of the main valve spool bore 47 is also connected by passages 75, 76 and 77 to an exhaust bore 78 in which is operatively mounted a second exhaust control valve, generally indicated by the numeral 86 (FIG. 1). As shown in FIG. 1, the exhaust flow control valves 85 and 86 are symmetrically and oppositely disposed in each of the valves 10. The exhaust flow control valves 85 and 86 are identical and permit the metering of exhaust from either end of an air cylinder or the like, to control the operating speed thereof, and also provide the advantages of stacking and a common electrical conduit or passage for the electric wires for the solenoids operating the valves 10 in a stack, so that the connection to the electric power for each solenoid may be made in each individual solenoid station.

As shown in FIG. 2, each of the valve body lower end portions 34 is provided with a pair of longitudinally extended, common pilot air passageways 105 which are disposed on opposite sides of the inlet air passage 65. The common pilot air passageways 105 are aligned with mating pilot air passages 105 in adjacent valves 10 in a stack of such valves. As shown in FIG. 3, each of the common pilot air passageways 105, in the valve 10 adjacent an end plate 11, communicates with a mating longitudinal passageway 103 in the end plate 11. Each of the passageways 103 is connected, by a transverse threaded bore 104, to the pressurized air inlet passage 109 in the end plate 11 and thence to the inlet port 64. It will be seen that the common pilot air passageways 105 can be supplied internally with pilot air from the inlet air port 64. If it is desired to provide an external supply of pilot air under pressure, then each of the passageways 104 can be closed by a plug, indicated by the numeral 108, which would be threadably mounted in the outer end of each of the threaded bores 104. Each of the passageways 103 in an end plate 11 could then be supplied through a passage 106 in the end plate 11 with pilot air under pressure from a suitable external source. The plug 107 which is threadably mounted in the outer end of each passage 106 when internal pilot air is used, would be removed to allow the passages 106 to be connected to said suitable source of external pilot air. It will be understood that both end plates 11 would be provided with the last described internal and external connection means, and passage means, for providing pilot air to the common pilot air passageways 105.

As shown in FIG. 2, the left pilot air passageway 105 communicates through a bore 111 with a longitudinal passageway 112 in the adaptor housing 56 of the pilot valve 57. The longitudinal passageway 112 communicates with a transverse pilot air passage 113 which is enclosed at its outer end by a threadably mounted plug 114. It will be understood that if internal pilot air is not supplied from the common pilot air passageways 105, the plug 114 could be removed and the passageway 113 connected to an external source of pilot air under pressure for supplying pressurized air to the pilot valve 57.

The pilot air valve 57 includes a pilot air valve element, generally indicated by the numeral 118, which is normally biased by a return spring 117 to the left, as viewed in FIG. 2, so as to block the flow of pilot air from the passageway 112 into the piston cylinder 115 to move the pilot piston 116 to the right to move the main valve spool 48 to the right, against the pressure of the valve return spring 74. The details of the structure and operation of the pilot valve 57 have not been given in detail since they do not form any part of the present invention. The details of the structure and operation of the pilot valve 57 are set forth in my co-pending application entitled "Four-Way Valve With Integral Flow Controls, Common Exhaust, And Cartridge Type Pilot Valve", Ser. No. 352,023, and the description of said pilot valve is incorporated herein by reference.

When the solenoid 58 is energized, the solenoid plunger 119 moves the pilot valve element 118 to the right, as viewed in FIG. 2, to allow pilot air to enter the piston cylinder 115 and move the pilot piston 116 to the right, to move the main valve spool 48 to the right against the pressure of the valve return spring 74. When the solenoid 58 is de-energized, the pilot air valve element 118 is returned to the position shown in FIG. 2 by the return spring 117, and the pilot air in the cylinder 115 behind, or to the left, of the pilot air piston 116, is allowed to exhaust down through the pilot valve structure and out through the front end of the piston cylinder 115, and through a transverse exhaust passage 120 which is connected to a longitudinal common pilot air exhaust passageway 122. The main valve spool 48 is returned to the position shown in FIG. 2 by the return spring 74. The pilot air exhaust passageways 122 in a stack of valves 10 are aligned with each other, and the valve 10 which is adjacent an end plate 11 has its pilot air passageway 122 connected to a longitudinal passageway 122 in the end plate 11 (FIG. 3). The end plate pilot air passage 122 is connected to a transverse passage 123 which extends to the outer side of the end plate 11 to permit the pilot air to be exhausted to the atmosphere. Alternatively, a muffler may be connected to the pilot air exhaust outlet passage 123, or suitable conduits may be connected thereto for conducting the exhausted pilot air to a point removed from the stack of valves.

The main valve spool 48 is shown generally, and it is schematically shown together with the return spring 74 to illustrate control by the main valve spool 48 of the flow of pressurized air between the inlet passage 65, the cylinder ports 66 and 67, and the exhaust port 82.

In use, the adjustable flow control valves 85 and 86 would be adjusted to provide a desired opening between the bore 78 and the valve element 88 of each of the flow control valves, to provide a desired speed of operation of an air cylinder to be controlled. It will be seen that the common electrical passage or channel 29, is advantageous in that only one conduit is necessary to bring in the necessary electrical wires to a stack of valves, and that each of the valves in the stack can be individually connected, as desired. The valves 10 of the present invention further provide the advantage of being able to provide a flow control function in the exhaust system of each of the valves, in a selective manner, and to have the exhaust air conveyed to one, or both, of the end plates 11, from where the exhaust air may be conducted to a muffler, or to a remote point, or exhausted to the atmosphere. A further advantage of the valve 10 of the present invention is that the valves 10 may be selectively provided with either an internal or an external supply of pressurized pilot air.

When the main valve spool 48 is in the position shown in FIG. 2, the inlet passage 65 is connected by the passage 69 to the cylinder port 67, while the cylinder port 66 is connected by passage 68 to the left exhaust passage 70.

When the solenoid 58 is energized, the main valve spool 48 is moved to the right to reverse the aforementioned flow conditions so that the inlet passage 65 supplies air under pressure to the cylinder port 66, and allows the other cylinder port 67 to exhaust to the exhaust passage 70 on the right end of the valve, as viewed in FIG. 2.

INDUSTRIAL APPLICABILITY

The four-way stacking valve with integral flow controls, common supply passageway, a common exhaust passageway, common electrical conduits, selective internal or external common pilot supply passageways, and common pilot exhaust passageways is adapted for use in industrial air use applications. The valve of the present invention may be used for connection to both ends of an air cylinder for controlling the operation of the same in both directions. The air cylinder may be employed in various types of industrial machines. The valve spool may be a two-position, single or double solenoid type, or a three-position, closed center or open center type.

I claim:

1. A four-way air valve which includes a valve body with a pressurized air supply chamber, a pair of cylinder chambers and a pair of exhaust chambers, and a main valve spool axially movable between two operative positions in a valve spool bore in the valve body to control flow of pressurized air from the air supply chamber to a selected one of said cylinder chambers while simultaneously controlling the exhaust from the other cylinder chamber to a selected one of said exhaust chambers, a top cover releasably mounted on said valve body, and means for moving the main valve spool between the two operative positions, characterized in that:

(a) said air supply chamber is disposed centrally along the valve spool bore, with the cylinder chambers disposed along the valve spool bore on opposite sides of said air supply chamber and adjacent thereto, and with the exhaust chambers disposed along the valve spool bore with one of the exhaust chambers adjacent to each one of the cylinder chambers on a side thereof opposite to the side adjacent to the air supply chamber;
   (b) the valve body is provided with a pressurized air inlet port which is connected by passage means in the valve body to the air supply chamber;
   (c) the valve body is provided with two cylinder ports which are each connected by separate passage means to one of the cylinder chambers;
   (d) the valve body is provided with a single exhaust port which is connected by a passage means to a common exhaust passageway in the valve body, and each of the exhaust chambers is connected to the common exhaust passageway by a separate exhaust passage;
   (e) each of said separate exhaust passages between each exhaust chamber and the common exhaust passageway includes a bore portion forming a valve seat on one end communicating with the common exhaust passageway;
   (f) an adjustable flow control valve, provided with a valve element, is operatively mounted in the valve body adjacent each of the separate exhaust passage bore portions and projecting through the top cover, with the valve elements thereof being movable into and out of the respective adjacent passage bore portions to control the flow of air exhausting from each exhaust chamber into the common exhaust passageway and out through the single exhaust port;
   (g) the valve body is provided with a common electrical wire passage that extends longitudinally therethrough; and,
   (h) the valve body is provided with an electrical wire tuck chamber on each side of the common electrical wire passage for receiving electrical lead wires from the common electrical wire passage.

2. A four-way air valve, as defined in claim 1, characterized in that:
   (a) each of said adjustable flow control valves is vertically disposed, and the flow control valves extend upwardly from the valve body through opposite corners of the valve body cover.

3. A four-way air valve, as defined in claim 2, characterized in that:
   (a) the longitudinal axes of said adjustable flow control valves are laterally offset from each other.

4. A four-way air valve, as defined in claim 3, characterized in that:
   (a) each of said adjustable flow control valves includes a valve stem that carries the valve element and which has an outer end extended exterior of the top cover to permit adjustment of the valve stem and valve element in its respective exhaust passage bore portion to control the flow of exhaust air to the common exhaust passageway.

5. A four-way air valve, as defined in claim 1, characterized in that:
   (a) said means for moving the main valve spool to at least one operative position comprises a solenoid operated pilot air valve.

6. A four-way air valve, as defined in claim 5, characterized in that:
 (a) said valve body includes electrical wire passages through which electrical wires are conducted to the solenoid operated pilot air valve, and thence to the solenoid for operating the pilot air valve.

7. A four-way air valve, as defined in claim 6, characterized in that:

(a) said valve body is T-shaped in end elevation view, with a top end portion that is wider than the lower end portion, and the common electrical wire passage and electrical wire tuck chambers and adjustable flow control valves are positioned in the wider top end portion, and the solenoid operated pilot air valve is secured to the valve body lower end portion.

* * * * *